United States Patent [19]

Cowles

[11] 4,134,097
[45] Jan. 9, 1979

[54] COMBINATION GEOPHONE-HYDROPHONE

[75] Inventor: Christopher S. Cowles, Houston, Tex.

[73] Assignee: Shell Oil Company, Houston, Tex.

[21] Appl. No.: 806,236

[22] Filed: Jun. 13, 1977

[51] Int. Cl.² .......................... G01V 1/18; G01V 1/40
[52] U.S. Cl. ................................. 340/7 R; 340/17 R; 181/102
[58] Field of Search ...... 340/15, 17 R, 7 R, 15.5 MC; 181/102

[56] References Cited

U.S. PATENT DOCUMENTS

| 2,717,369 | 9/1955 | Bardeen et al. | 340/17 R |
| 3,290,645 | 12/1966 | Pavey, Jr. et al. | 340/17 R |
| 3,332,057 | 7/1967 | Pavey, Jr. | 340/17 R |

Primary Examiner—Howard A. Birmiel

[57] ABSTRACT

A method and apparatus for measuring and identifying up- and down-traveling waves wherein both a velocity-sensitive and pressure-sensitive transducer are disposed at a point below the earth's surface, as for example in a borehole that is refilled. The pressure transducer is designed to provide intimate contact with the formation surrounding the borehole, and in addition, is the electrical equivalent of the velocity transducer.

7 Claims, 5 Drawing Figures

COMBINATION GEOPHONE-HYDROPHONE

BACKGROUND OF THE INVENTION

The present invention relates to seismic exploration and particularly to a method and apparatus for detecting and measuring up- and down-traveling seismic waves. In U.S. Pat. No. 2,740,945, there is disclosed a method for measuring up- and down-traveling seismic waves. In particular, the patent discloses the use of a pressure-sensitive seismic detector, such as hydrophone, in combination with a velocity-sensitive seismic detector, such as a geophone, to measure the seismic waves resulting from the seismic disturbances. The outputs of the two detectors can be either compared or combined to determine the direction of arrival of the seismic waves at the detectors. Also, the signals can be combined so as to substantially eliminate the downwardly-traveling waves which result from a reflected seismic wave being reflected a second time from an interface above the position of the detectors.

The patent describes the positioning of the combination velocity-sensitive and pressure-sensitive detectors in a fluid-filled borehole. The patent then describes that the signals from the detector can be transmitted to the surface where they can be recorded. The patent also describes the use of amplifiers and filters at the surface recording station to match the frequency and phase of the two signals.

While the above system describes the use of pressure-sensitive and velocity-sensitive detectors to detect up- and down-traveling waves, it only describes their use in a fluid-filled borehole. In fluid-filled boreholes, however, seismic waves trapped in the borehole, commonly called tube waves, have amplitudes which will exceed the normal amplitudes of seismic waves of interest. Thus, the tube waves will completely obscure the real signals of interest. Also, the use of filters in an attempt to match the phase and frequency of the received signals may eliminate certain frequencies of interest and consequently, not produce the desired results.

BRIEF DESCRIPTION OF THE INVENTION

The present invention solves the above problems by providing a geophone-hydrophone combination in a single housing. In particular, the geophone is rigidly mounted in the housing so that the velocity of the housing will be detected by the geophone while the hydrophone is mounted so that the housing may be buried in a solid material. In particular, the hydrophone is mounted in a section of the housing having a flexible diaphragm which can be exposed to contact with the material used for burying the housing; thus, the hydrophone responds to pressure in the earth produced by seismic waves.

In addition, the housing includes electronics so that the hydrophone can be made the electrical equivalent of the geophone. By converting the hydrophone to the electrical equivalent of the geophone, the hydrophone will have the same response characteristics to pressure as the geophone has to velocity. Thus, one can easily combine the signals, either by adding them or subtracting them, to detect the presence of up- and down-traveling seismic waves. The electronic circuit consists of a transformer so designed that its equivalent circuit, when combined with that of the hydrophone, produces a circuit which is the electrical equivalent of the geophone.

BRIEF DESCRIPTION OF THE DRAWINGS

The present invention will be more easily understood from the following detailed description when taken in conjunction with the attached drawings in which.

PREFERRED EMBODIMENT

Figure 1:
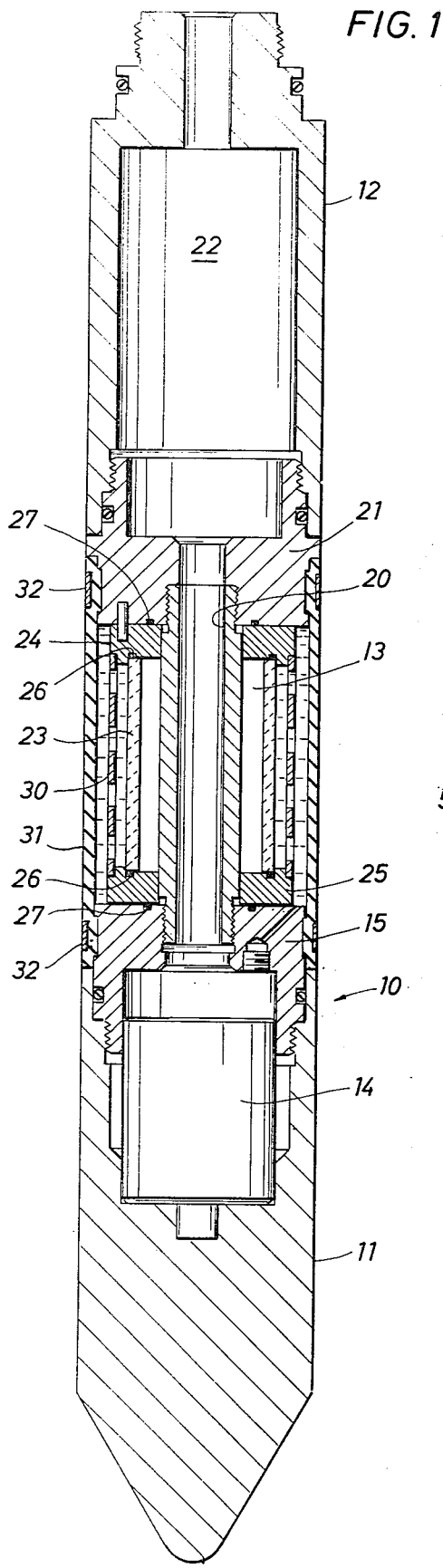
FIG. 1 is an elevation view in section of the geophone-hydrophone combination.

Referring now to FIG. 1, there is shown an elevation view of the combination geophone-hydrophone of the present invention. In particular, the housing 10 is provided with a lower geophone housing 11, and an upper electronics housing 12, with the hydrophone 13 being disposed between the upper and lower housings. The lower geophone housing 11 should be constructed of suitable material, such as brass or aluminum, and made sufficiently rugged to prevent physical damage to the geophone when the complete housing is buried. The geophone 14 is disposed in a recess formed in the housing and securely fastened to the housing by a combination of epoxy cement and cap member 15 which threads into the upper end of the geophone housing. The electronics package 22 is disposed in the electronics housing 12 and potted in place with a suitable plastic. A cap 21 which threads into the lower end of the electronics housing is used to close the housing 12. The geophone and electronics housings are spaced apart by a central tubular spacer 20 which threads into the caps 15 and 21. The interior of the spacer provides a passage for the leads from the geophone and the hydrophone crystal to the electronics package.

The hydrophone comprises a section of a cylindrical crystal of piezoelectric material 23. The cylindrical crystal is mounted between suitable insulating end plates 24 and 25 with the ends of the crystal sealed at the end plates by means of O-rings 26. Similarly, the end plates are sealed to the end caps of the geophone and electronics housing by O-rings 27. The use of the O-ring seals completely isolates the interior of the housing from the exterior of the cylindrical crystal. A suitable protective screen 30 is positioned around the exterior of the crystal while a flexible diaphragm, for example a rubber sleeve 31, surrounds the screen. The ends of the rubber sleeve can be secured to the exterior of the geophone and electronics housing by means of suitable clamps 32. In addition, the space between the rubber sleeve and the cylindrical crystal should be filled with a suitable noncompressible liquid, for example oil. Alternatively, the protective screen and filling liquid may be eliminated, and the flexible diaphragm bonded directly to the exterior surface of the crystal.

Figure 2:
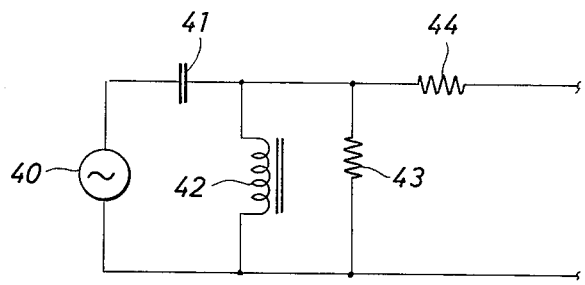
FIG. 2 is the electrical equivalent circuit of the geophone.

Referring to FIG. 2, there is shown a serially-connected velocity-dependent voltage source 40, capacitance 41, inductance 42, parallel resistance 43, and series resistance 44, which represent the electrical equivalent circuit of the geophone.

Figure 3:
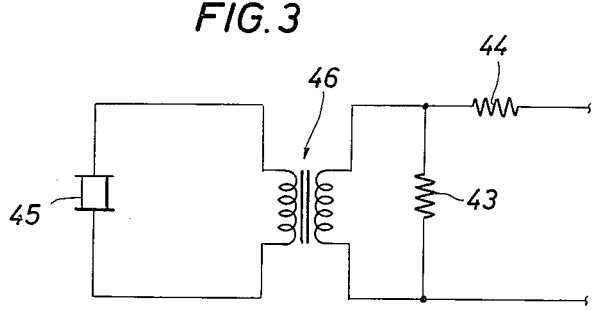
FIG. 3 is the electrical circuit of the hydrophone.

In FIG. 3, the hydrophone crystal 45 is shown coupled by means of transformer 46 and the resistances 43 and 44 to the signal lines.

Figure 4:
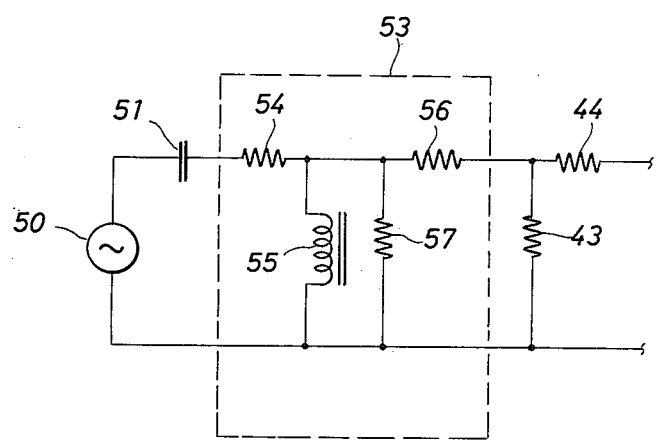
FIG. 4 is the electrical equivalent circuit of the hydrophone crystal-transformer combination.

Referring to FIG. 4, the hydrophone crystal can be represented by the pressure-dependent voltage source 50 in series with a capacitor 51, while the transformer 46 of FIG. 3 can be represented by the equivalent circuit 53 composed of the equivalent secondary winding resistance 54, equivalent primary inductance 55, equivalent primary resistance 56, and equivalent core-loss resistance 57. In a gross sense, a transformer may be thought of as an impedance transforming device by which an electrical impedance may be decreased or increased by a factor equal to the square of the turns ratio of the transformer. For example, assume that the transformer 46 has a primary-to-secondary turns ratio of 1:20, and that a hydrophone crystal whose capacitance is 0.0325uF is connected across the secondary. Measuring into the primary of the transformer, one will see an impedance equal to 1/400 of the impedance of the given capacitor, equivalent to a capacitor whose value is 13UF (400 × 0.0325uF). Thus, the capacitor 51 has a value equal to the value of hydrophone capacitance multiplied by the square of the turns ratio of the transformer. Likewise, the resistance 54 has a value equal to the value of the secondary winding resistance divided by the square of the turns ratio of the transformer. In parallel with that impedance, one will also measure (winding resistances and core losses neglected) at the primary, the inductive reactance of the primary. This is essentially the reactance one would measure if dealing only with the primary winding and treating the transformer as an inductor.

Thus, by proper design of the transformer the equivalent circuit of the hydrophone may approach arbitrarily close to the equivalent circuit of the geophone. By properly choosing the turns ratio between the primary and the secondary, the value of the hydrophone capacitance connected to the secondary of the transformer, as seen at the primary of the transformer, can be made substantially equal to the equivalent capacitance of the geophone. Similarly, by proper design of the transformer, the resistances 54 and 56 may be made satisfactorily small, the resistance 57 may be made satisfactorily large, and the inductance 55 may be made equal to the equivalent inductance 42 of the geophone. Thus, the hydrophone circuit of FIG. 3 will have substantially the same phase and amplitude response to pressure as the geophone has to velocity. Using the representative values of the capacitance above, a turns ratio of 20-to-1 will make the hydrophone's circuit the substantial equivalent of the geophone's circuit.

Using the above combination geophone-hydrophone, a borehole should first be drilled to a selected depth. Preferably, the depth will be below the weathered or unconsolidated near-surface formations. The combination geophone-hydrophone can be lowered into the borehole and the borehole filled with solid material, at least to a depth sufficient to cover the geophone-hydrophone. A suitable material would be fine gravel or sand. Burying the geophone-hydrophone eliminates the possibility of tube waves traveling in the fluid-filled borehole and obscuring the seismic signals of interest. Also, the use of solid material insures that any pressure waves traveling in the formation will be transmitted directly to the rubber sleeve that surrounds the hydrophone crystal. Of course, the solid-filling will also transmit the motion of the formation to the geophone so that the particle velocities of the formation can be detected. The signals from the combination geophone-hydrophone can be transmitted to the surface where they can be recorded by conventional seismic equipment. At times it may be desirable to bury a plurality of geophone-hydrophones in a borehole to obtain multiple records which can be combined by various seismic techniques to improve the signal-to-noise ratio.

The above description is based on geophones that produce a positive signal in response to a downward velocity and hydrophones that produce a positive signal in response to a pressure increase. Of course, geophones and hydrophones having different but known response can also be used.

It is also possible to transmit both the geophone and hydrophone signals to the surface, separately record each signal, and then convert the hydrophone signal to make it the electrical equivalent of the geophone signal. This can be done if both signals are recorded in a manner that preserves their relative amplitude and phase. A suitable recording means would be a digital recording system having gain-ranging amplifiers that preserve a digital indication of the amplitude of the signals.

The first step in using this method for converting the hydrophone to the electrical equivalent of the geophone is the placement of the geophone-hydrophone combination in relation to the location of the source of seismic energy. In particular, the geophone-hydrophone combination should be located below the seismic sources to insure that the first seismic wave arriving at the geophone-hydrophone will be the downwardly-traveling wave from the source. The second step is the separate recording of the geophone and hydrophone responses to provide mathematical or tabulated expressions of the responses. A satisfactory recording can be obtained using a conventional digital seismic recording system having gain-ranging amplifiers.

Figure 5:
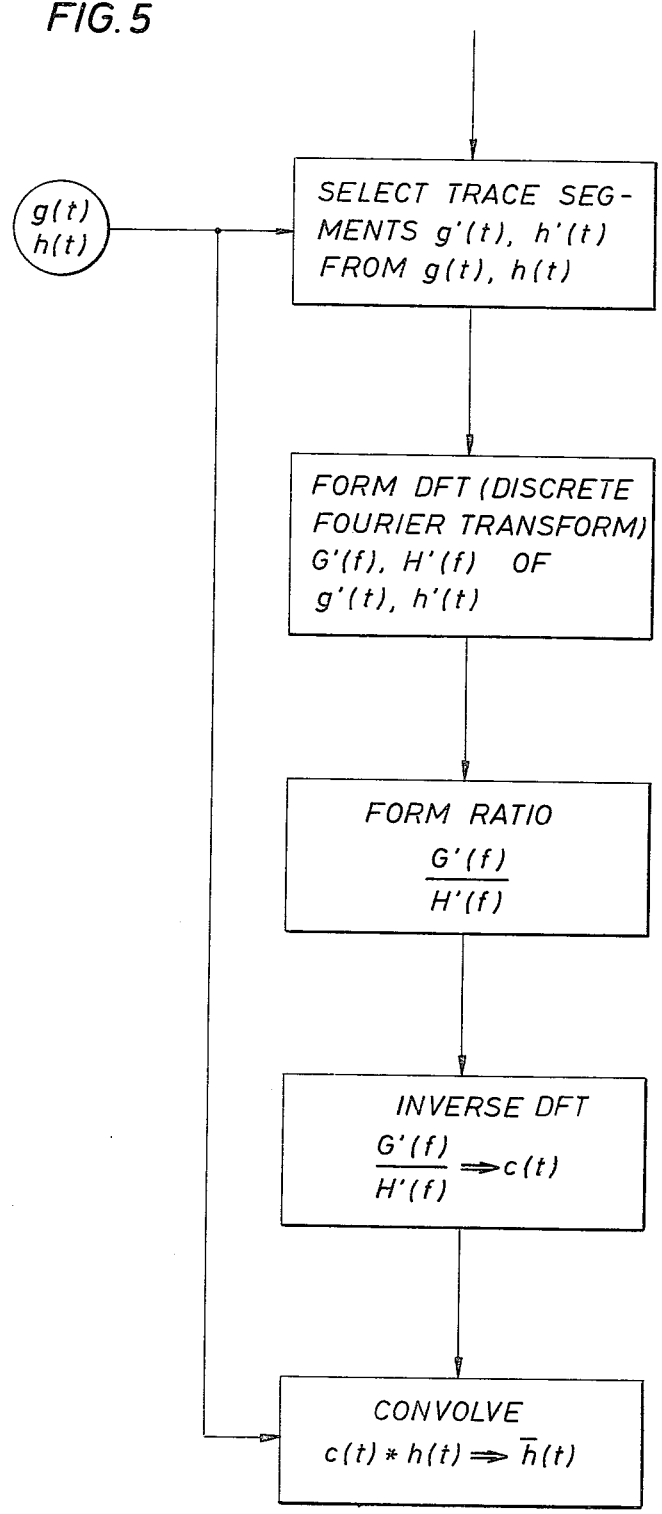
FIG. 5 is a flow sheet showing the necessary steps for processing the signals on a general purpose computer.

After the signals are digitally recorded in the field, they are processed at a central facility using digital computers. FIG. 5 illustrates the necessary processing steps for developing the mathematical function required to convert the hydrophone signal to the equivalent of the geophone. The first step is to convert the initial portions, designated g'(t) and h'(t), representing the passage of the initial down-traveling seismic wave, of both the hydrophone and geophone signals, g(t) and h(t), to their respective discrete Fourier transforms, G'(f) and H'(f). Only the initial portion of each recording is used to insure that the Fourier transforms relate to downwardly-traveling waves. The ratio, G'(f):H'(f), of the two transforms is then obtained, using complex arithmetic and the inverse discrete Fourier transform of that ratio is computed to obtain the required time (transfer) function, c(t). Alternatively, the ratio (G'(f) × H'*(f)):(H'(f) × H'*(f) + δ) may be used in place of the ratio G'(f):H'(f) where it is necessary to avoid division by zero. Here, H'*(f) represents the complex conjugate of H'(f), and δ is a constant of suitable magnitude added to the denominator to prevent division by zero. The entire hydrophone trace is then convolved with the derived time function, c(t), to obtain a trace that is the same as a trace which would be obtained from a hydrophone that is the electrical equivalent of the geophone. Of course, one may also take the ratio H'(f):G'(f) to obtain a time function that can be used in convolving the geophone trace to obtain a trace that is the same as a trace which would be obtained from a geophone that is the electrical equivalent of the hydrophone.

The above operations can be carried out on any general-purpose digital computer by those skilled in the seismic data processing art. The processing of digitally recorded seismic data to obtain discrete Fourier transforms of the data, and the development of time functions for convolving data are well-known processes. Thus, no description of the detailed programming of the computer is included. While the method of processing the data is understood, it is important that the time function used in convolving the recorded data be based on downwardly-traveling seismic waves. In the present invention, this is insured by placing the geophone-hydrophone combination below the source of seismic energy and using only the initial portion of the recordings.

While the preferred method of practicing the invention is to locate the seismic source above the detector, it is possible to practice the invention with the source located below the detectors. When the source is located below the detectors, the invention is practiced using the initial up-traveling waves. The remainder of the process will be substantially the same.

While the geophone-hydrophone are buried, and thus lost, they are relatively simple in construction and low in cost. The cost of the geophone-hydrophone combination, in comparison with the overall cost of the seismic operation, is small and is not a major factor. Further, the improved records obtained by separating the up- and down-traveling seismic waves more than compensates for the slight additional cost of the geophone-hydrophone.

I claim as my invention:

1. A method for measuring and separating up- and down-traveling seismic waves comprising:
    lowering both a geophone and hydrophone to substantially the same depth in a borehole:
    packing the borehole with solid material at least to a level above the depth of the geophone and hydrophone;
    coupling the hydrophone to a circuit disposed adjacent the hydrophone, said circuit in combination with said hydrophone producing a hydrophone signal in response to pressure having the same phase and amplitude as the signal produced by the geophone in response to velocity;
    separately coupling said geophone and hydrophone to a recording system; and
    separately recording said geophone and hydrophone signals.

2. The method of claim 1 in which the hydrophone is positioned in the borehole and the borehole is filled so that the sensitive elements of the hydrophone are responsive to pressure waves in the formation, and pressure waves traveling in the borehole are suppressed.

3. A combination geophone-hydrophone comprising:
    a tubular housing;
    a velocity-sensitive geophone, said geophone being fixedly mounted in said housing to respond to the velocity of said housing;
    a pressure-sensitive hydrophone, said hydrophone being mounted in said housing;
    a flexible diaphragm, said diaphragm forming a portion of the wall of said housing adjacent said hydrophone whereby said hydrophone may respond to the pressure to which the housing is exposed; and,
    circuit means, said circuit means being mounted in said housing and coupled to said hydrophone to convert said hydrophone to produce and electrical signal in response to pressure having the same phase and amplitude as the electrical signal produced by the geophone in response to velocity.

4. The combination geophone-hydrophone of claim 3 wherein said hydrophone comprises a cylindrical piezoelectric crystal, mounted in said housing with its axis coaxial with the axis of said housing, said flexible diaphragm being disposed to surround said crystal and the space between the crystal and the diaphragm being filled with a noncompressible fluid.

5. The combination geophone-hydrophone of claim 3 wherein said housing comprises a lower geophone compartment and an upper electronics compartment, said compartments being separated by a tubular spacer; said hydrophone comprising a cylindrical piezoelectric crystal disposed to surround said spacer, and said flexible diaphragm surrounding said crystal and forming the outer wall of said housing between said compartments.

6. The combination geophone-hydrophone of claim 5 wherein said crystal is clamped between said compartments and sealing means disposed to seal the ends of said crystal to prevent fluid leakage into the space enclosed by said crystal.

7. The combination geophone-hydrophone of claim 6, and in addition, said circuit means comprising a transformer whose turns ratio is selected so that the transformed capacitance of the crystal is the equivalent of the capacitance of the geophone, and whose inductance is designed to be equivalent to that of the geophone.

* * * * *